United States Patent [19]
Noguchi et al.

[11] Patent Number: 5,977,758
[45] Date of Patent: Nov. 2, 1999

[54] OVERCURRENT PROTECTION CIRCUIT AND OVERCURRENT PROTECTION METHOD OF THE CIRCUIT

[75] Inventors: Minoru Noguchi, Hanyu; Takahiro Katsumi, Fukaya; Toshiyuki Suzuki, Kumagaya; Toshiyuki Kawagishi, Tokyo, all of Japan

[73] Assignee: Kabushiki Kaisha Toshiba, Kawasaki, Japan

[21] Appl. No.: 09/032,024

[22] Filed: Feb. 27, 1998

[30] Foreign Application Priority Data

Feb. 27, 1997 [JP] Japan ................................... 9-043822

[51] Int. Cl.⁶ ...................................................... G05F 1/445
[52] U.S. Cl. ............................ 323/283; 323/908; 323/303
[58] Field of Search .................................... 323/303, 901, 323/908, 282, 283, 284; 361/18, 93, 94

[56] References Cited

U.S. PATENT DOCUMENTS 5,568,347  10/1996  Shirai et al. ............................... 361/98
5,710,508  1/1998  Watanabe ................................. 323/284
5,784,231  7/1998  Majid et al. ............................... 361/18

Primary Examiner—Y. J. Han
Attorney, Agent, or Firm—Pillsbury Madison & Sutro LLP

[57] ABSTRACT

In an overcurrent protection circuit, when a control section turns on a switch in response to a signal from a microcomputer so that power is supplied from a power source to an IC card, a signal controlling section prevents the overcurrent protection circuit from functioning even if a current greater than a predetermined level is detected by a current detecting section, until a voltage of the IC card is stabilized. When the control section turns off the switch in response to a signal from the microcomputer, the power supply from the power source to the IC card is stopped, thereby preventing a malfunction of the overcurrent protection circuit, even if the microcomputer goes out of control or malfunctions.

4 Claims, 2 Drawing Sheets

| INPUT | | OUTPUT |
|---|---|---|
| TERMINAL R (RESET) | TERMINAL PR (PRESET) | TERMINAL Q |
| Lo | Hi | Lo |
| Hi | Lo | Hi |
| Lo | Lo | Hi |

OVERCURRENT PROTECTION CIRCUIT AND OVERCURRENT PROTECTION METHOD OF THE CIRCUIT

BACKGROUND OF THE INVENTION

The present invention relates to an overcurrent protection circuit and an overcurrent protection method for protecting an electric or electronic device, such as an IC (Integrated Circuit) incorporated in an IC card, from an overcurrent due to abnormality in the circuits of the device.

An electric or electronic device, such as an IC card, incorporates an overcurrent protection circuit for protecting the device from overcurrent due to abnormality in the circuits of the device.

Conventionally, a type of overcurrent protection circuit in an electric or electronic device is formed by of a microcomputer and a logical circuit for controlling operations of the circuits in the device. Such an overcurrent protection circuit having a microcomputer and a logical circuit may malfunction when the microcomputer goes out of control or malfunctions or power is supplied thereto.

BRIEF SUMMARY OF THE INVENTION

An objective of the present invention is to provide an overcurrent protection circuit and an overcurrent protection method to prevent a circuit from malfunctioning when a microcomputer goes out of control or power is supplied to the circuit.

According to a first aspect of the invention, a power supply device for supplying power to an electronic device acting as a load, includes a power source means for providing power to be supplied to the electronic device, an overcurrent protecting means for stopping power supply to the electronic device when a current supplied to the electronic device is greater than a predetermined current and a stopping means for stopping an operation of the overcurrent protecting means until a load voltage of the electronic device is stabilized when power is first supplied to the electronic device.

According to a second aspect of the invention, an overcurrent protection circuit is incorporated in a power supply device for supplying power to an electronic device acting as a load. The overcurrent protection circuit includes a power source circuit for providing power to be supplied to the electronic device, a controlling circuit for controlling supply and stop of the power provided by the power source circuit to be supplied to the electronic device, a detecting circuit for detecting the current supplied to the electronic device and outputting a signal for stopping the supply of the power to the electronic device by means of the controlling circuit when a current greater than the predetermined current is detected, and a stopping circuit for stopping a detecting operation of the detecting circuit until a load voltage of the electronic device is stabilized when power is first supplied to the electronic device.

According to a third aspect of the invention, an overcurrent protection circuit includes a power supply means for supplying power, a switch means for switching the power supply and power supply to an IC card connected to the power supply means, a current detecting means for detecting whether a current exceeds a predetermined detection level when power is supplied from the power supply means to the IC card a stop means for stopping the power supply by switching the switch means when the current detection means detect that the current exceeds the predetermined detection level, a microcomputer for outputting an instruction signal for switching the switch means a first control means for controlling the predetermined detection level of the current detection means to be a lower detection level until a load voltage of the IC card is stabilized when power is supplied from the power supply means to the IC card by switching the switch means in accordance with an instruction signal outputted from the microcomputer and a and second control means for performing control to prevent a malfunction due to a false signal output from the microcomputer when power supply from the power supply means to the IC card is stopped by switching the switch means in accordance with an instruction signal outputted from the microcomputer.

According to a fourth aspect of the invention, a method for controlling an overcurrent protection circuit incorporated in a power supply device for supplying power to an electronic device acting as a load, wherein a current supplied to the electronic device is detected by a detecting circuit and the power supply to the electronic device is stopped, when the detected current is greater than a predetermined current. This method includes stopping an operation of the detecting circuit until a load voltage of the electronic device is stabilized when power is first supplied to the electronic device and releasing the stop of the operation of the detecting circuit after the load voltage of the electronic device is stabilized.

According to a fifth aspect of the invention, a method for controlling an overcurrent protection circuit including a switch means for switching power supply and stopping the power supply to an IC card that is connected to a power supply means for supplying power a microcomputer for outputting an instruction signal for switching the switch means and a current detecting means for detecting whether a current exceeds a predetermined detection level when power is supplied from the power supply means to the IC card. This method includes lowering the predetermined detection level of the current detection means to be a lower detection level when power is supplied from the power supply means to the IC card by switching the switch means in accordance with an instruction signal output from the microcomputer and raising the lower detection level of the current detection means to be the predetermined detection level in accordance with an instruction signal outputted from the microcomputer when the load voltage of the IC card supplied with the power is stabilized.

Additional objectives and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Figures 1, 3:
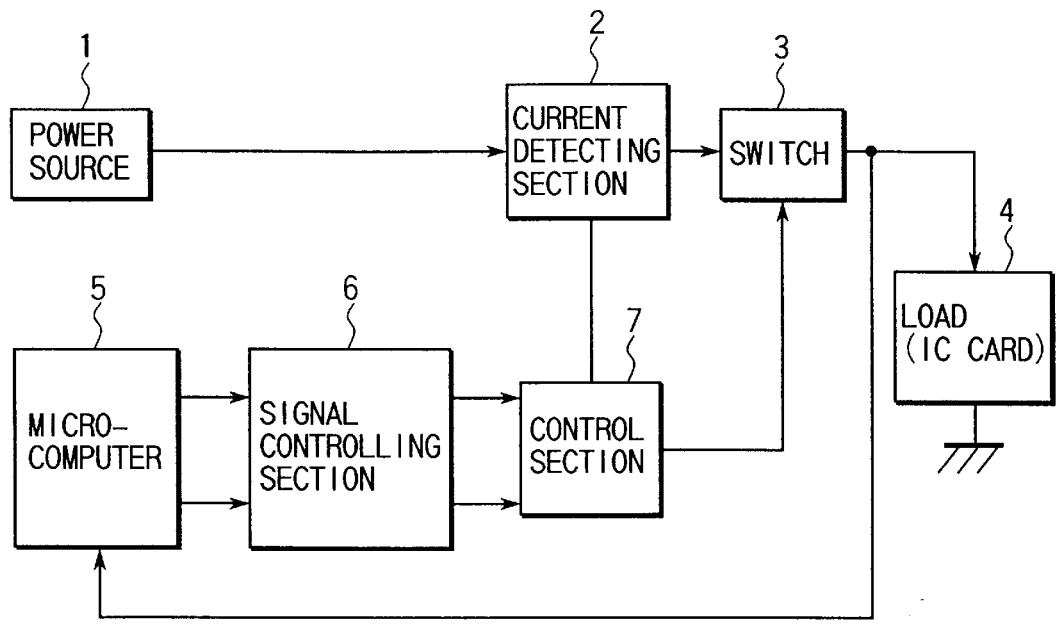
FIG. 1 is a block diagram showing a schematic structure of an overcurrent protection circuit according to the present invention.
FIG. 3 is a diagram for explaining true values of the flip-flop circuit shown in FIG. 2.

FIG. 1 shows a schematic structure of an overcurrent protection circuit according to the present invention. The overcurrent protection circuit comprises a power source 1 serving as power supplying means, a current detecting section 2 serving as current detecting means, a switch 3 serving as switching means, a load 4 such as an electric or electronic device, a microcomputer 5, a signal controlling section 6 and a control section 7.

The load 4 is, for example, an IC incorporated in an IC card. Power is supplied to the IC card which is connected to the circuit of the present invention through in an IC card reader/writer. In the following description, the load is referred to as the IC card 4.

The control section 7 turns on the switch 3 in response to a signal supplied from the microcomputer 5, so that power can be supplied to the IC card 4. After the power is supplied, the current detecting section 2 detects a current flowing through the IC card 4. The control section 7 determines whether the amount of the current is greater or smaller than a preset current, and controls whether of the switch 3 is in an ON/OFF State.

The signal controlling section 6 protects the control section 7 from the microcomputer if the microprocessor outputs an abnormal signal or otherwise malfunctions.

Figure 2:
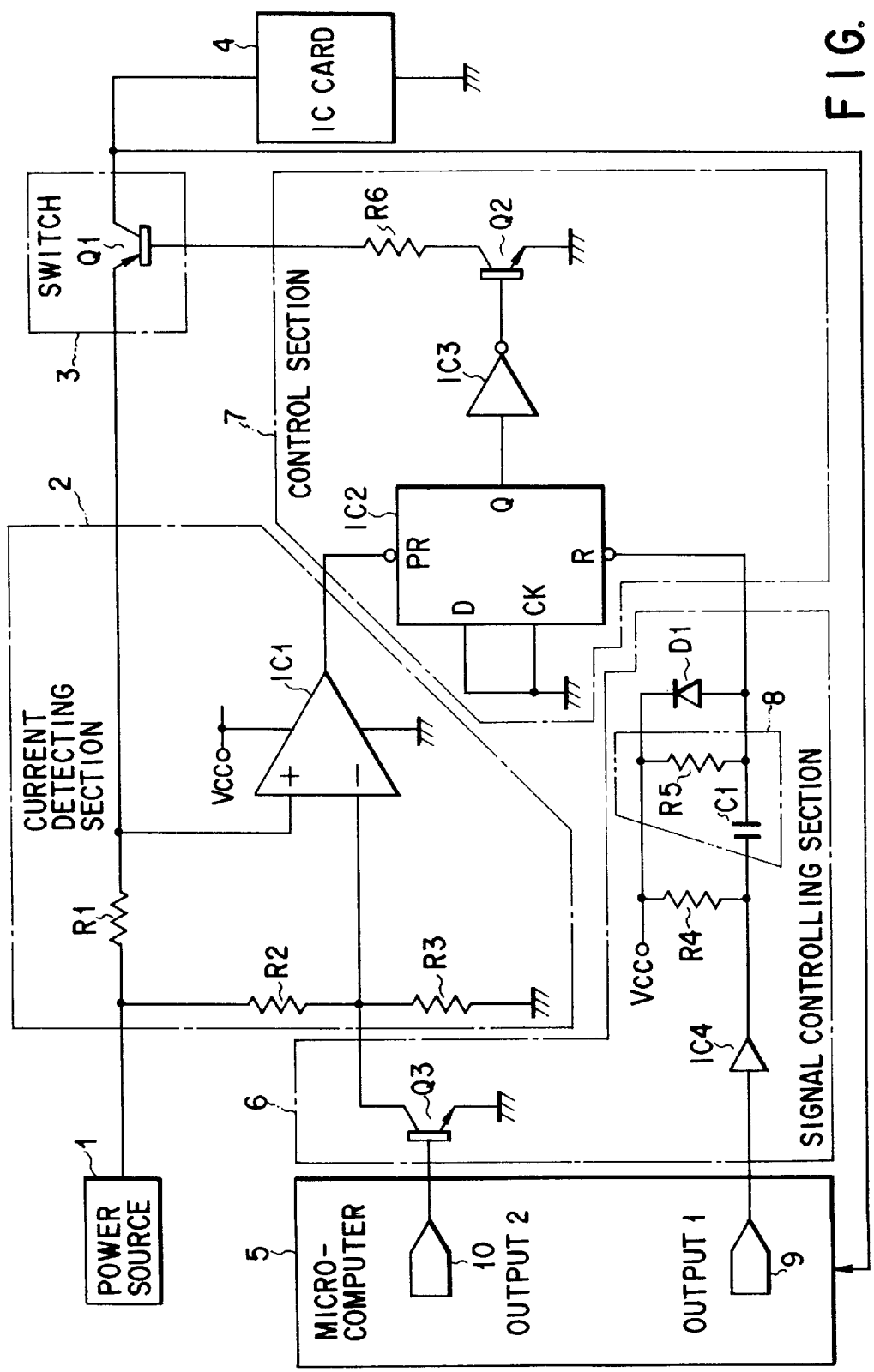
FIG. 2 is a circuit diagram of the overcurrent protection circuit of the present invention.

FIG. 2 shows a structure of the overcurrent protection circuit. The overcurrent protection circuit has the elements described above with reference to FIG. 1. The current detecting section 2 comprises a current detecting resistor R1, reference voltage resistors R2 and R3, and a voltage comparator IC1. The switch 3 comprises a power cutoff transistor Q1. The computer 5 outputs an output 1 through a terminal 9 and an output 2 through a terminal 10.

The signal controlling section 6 comprises a transistor Q3, a power limiting resistor R4, a differential circuit 8 having a resistor R5 and a capacitor Cl, an overvoltage protecting diode D1, and a buffer IC4. The control section 7 comprises a transistor Q2, a flip-flop circuit IC2, an inverter IC3 and an adjusting resistor R6. The power limiting resistor R4 limits a charge current supplied to the capacitor C1, when a low pulse of the output 1 from the terminal 9 rises in the microcomputer 5. The overvoltage protecting diode D1 prevents an overvoltage of a terminal R of the flip-flop circuit IC2, when the capacitor C1 is charged.

An operation of the overcurrent protection circuit shown in FIG. 2 will now be described.

First, the microcomputer 5 causes the output 2 from the terminal 10 to be high (Hi). As a result, the base terminal of the transistor Q3 becomes high in level, so that the transistor Q3 is turned on. In the voltage comparator IC1, the negative terminal becomes low (Lo) in level because the transistor Q3 is on and the level of the output voltage is high. Since the output voltage of the voltage comparator IC1 is high, a terminal PR of the flip-flop circuit IC2 is high in level. Further, the microcomputer 5 causes the output 1 from the terminal 9 to be low, causing a terminal R of the flip-flop IC2 to be low via the buffer IC4.

In the flip-flop circuit IC2, since the terminal PR is high in level and the terminal R is low in level, the terminal Q is low. The inverter IC3 inverts a low signal output from the terminal Q to a high signal, which is input to the base terminal of the transistor Q2. As a result, the transistor Q2 is turned on.

When the transistor Q2 is on, the transistor Q1 is also on, so that power is supplied from the power source 1 to the IC card 4.

In this embodiment, the microcomputer 5 causes the negative terminal of the voltage comparator IC1 to be low in level while it is keeping the output 2 from the terminal 10 at the high level. Therefore, the current detecting section 2 does not work until the capacitor (not shown) of the IC card 4 is charged. Thus, the overcurrent protection circuit avoids malfunctioning.

After the voltage of the IC card 4 is stabilized, the microcomputer 5 causes the output 2 from the terminal 10 to be low in level, so that a voltage is applied to the negative terminal of the voltage comparator IC1 through the reference voltage resistors R2 and R3. In the voltage comparator IC1 for comparing voltages, the voltage at the positive terminal is varied by a voltage drop due to a current flowing through the current detecting resistor R1.

If the IC card 4 malfunctions when the current flowing through the current detecting resistor R1 is increased and the voltage of the positive terminal of the voltage comparator IC1 is less than that of the negative terminal, the voltage comparator IC1 outputs a voltage of low level, which causes the PR terminal of the flip-flop circuit IC2 to be low in level. As a result, since the terminal PR and the terminal R of the flip-flop circuit IC2 are low in level, the terminal Q thereof is high in level. The inverter IC3 inverts a high signal output from the terminal Q to a low signal, which is input to the base terminal of the transistor Q2, thereby turning off the transistor Q2. When the transistor Q2 is off, the transistor Q1 is also off, with the result that power supply from the power source 1 to the IC card 4 is stopped. Thus, if the IC card 4 malfunctions, the power supply from the power source 1 to the IC card 4 is stopped by the transistor Q1.

FIG. 3 shows true values of the flip-flop circuit IC2 described above.

For example, in the flip-flop circuit IC2, when the terminal R (Reset) is high and the terminal PR (Preset) is low, the terminal Q is high. The inverter IC3 inverts a high signal output from the terminal Q to a low signal, which is input to the base terminal of the transistor Q2, thereby turning off the transistor Q2. When the transistor Q2 is off, the transistor Q1 is also off, with the result that power supply from the power source 1 to the IC card 4 is stopped.

When the power supply to the IC card 4 is stopped, the amount of current flowing through the current detecting resistor R1 is reduced. Accordingly, the voltage at the positive terminal of the voltage comparator IC1 is increased and becomes higher than the voltage at the negative terminal thereof. Therefore, the voltage comparator IC1 outputs a voltage of high level, which is inputted into to the terminal PR of the flip-flop circuit IC2. However, in the flip-flop circuit IC2, even if a signal inputted into to the terminal PR is changed, the state of the terminal Q remains unchanged, unless a low signal is inputted into to the terminal R. Therefore, the power supply of the IC card 4 is kept from supplying power.

At this time, if the microcomputer 5 goes out of control or malfunctions, the output 1 from the terminal 9 is a low signal. However, since only low pulses of the output 1 from the terminal 9 are inputted through the differential circuit 8 to the terminal R of the flip-flop circuit IC2, the overcurrent protection circuit is prevented from malfunctioning.

As described above, according to the embodiment of the present invention, the overcurrent protection circuit is prevented from malfunctioning when power is supplied to the IC card (load) and from stopping when the microcomputer goes out of control.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An overcurrent protection circuit comprising:

power supply means for supplying power;

switch means for switching power supply and stopping the power supply to an IC card connected to the power supply means;

current detecting means for detecting whether a current exceeds a predetermined detection level when the power is supplied from the power supply means to the IC card;

stop means for stopping the power supply by switching the switch means when the current detecting means detects that the current exceeds the predetermined detection level;

a microcomputer for outputting an instruction signal for switching the switch means;

first control means for controlling the predetermined detection level of the current detecting means to be a lower detection level until a load voltage of the IC card is stabilized when the power is supplied from the power supply means to the IC card by switching the switch means in accordance with an instruction signal outputted from the microcomputer; and second control means for performing control to prevent a malfunction due to a false signal outputted from the microcomputer when power supply from the power supply means to the IC card is stopped by switching the switch means in accordance with an instruction signal outputted from the microcomputer.

2. The overcurrent protection circuit according to claim 1, wherein the first control means lowers the predetermined detection level of the current detecting means to be a lower detection level when the power is supplied from the power supply means to the IC card by switching the switch means in accordance with the instruction signal outputted from the microcomputer and raises the lower detection level of the current detecting means to be the predetermined detection level in accordance with the instruction signal outputted from the microcomputer when the load voltage of the IC card supplied with the power is stabilized.

3. The overcurrent protection circuit according to claim 1, wherein the second control means prevents a malfunction due to the false signal outputted from the microcomputer by means of a differential circuit when the power supply from the power supply means to the IC card is stopped in accordance with the instruction signal outputted from the microcomputer.

4. A method for controlling an overcurrent protection circuit for an IC card reader/writer including:

switch means for switching power supply and stopping the power supply to an IC card connected to a power supply means for supplying power;

a microcomputer for outputting an instruction signal for switching the switch means; and current detecting means for detecting whether a current exceeds a predetermined detection level when the power is supplied from the power supply means to the IC card, said method comprising:

lowering the predetermined detection level of the current detecting means to be a lower detection level when the power is supplied from the power supply means to the IC card by switching the switch means in accordance with an instruction signal outputted from the microcomputer; and raising the lower detection level of the current detecting means to be the predetermined detection level in accordance with an instruction signal output from the microcomputer when the load voltage of the IC card supplied with the power is stabilized.

* * * * *